Oct. 12, 1926.  1,602,860
F. H. SLEEPER
MACHINE TOOL
Filed Dec. 8, 1923    4 Sheets-Sheet 2
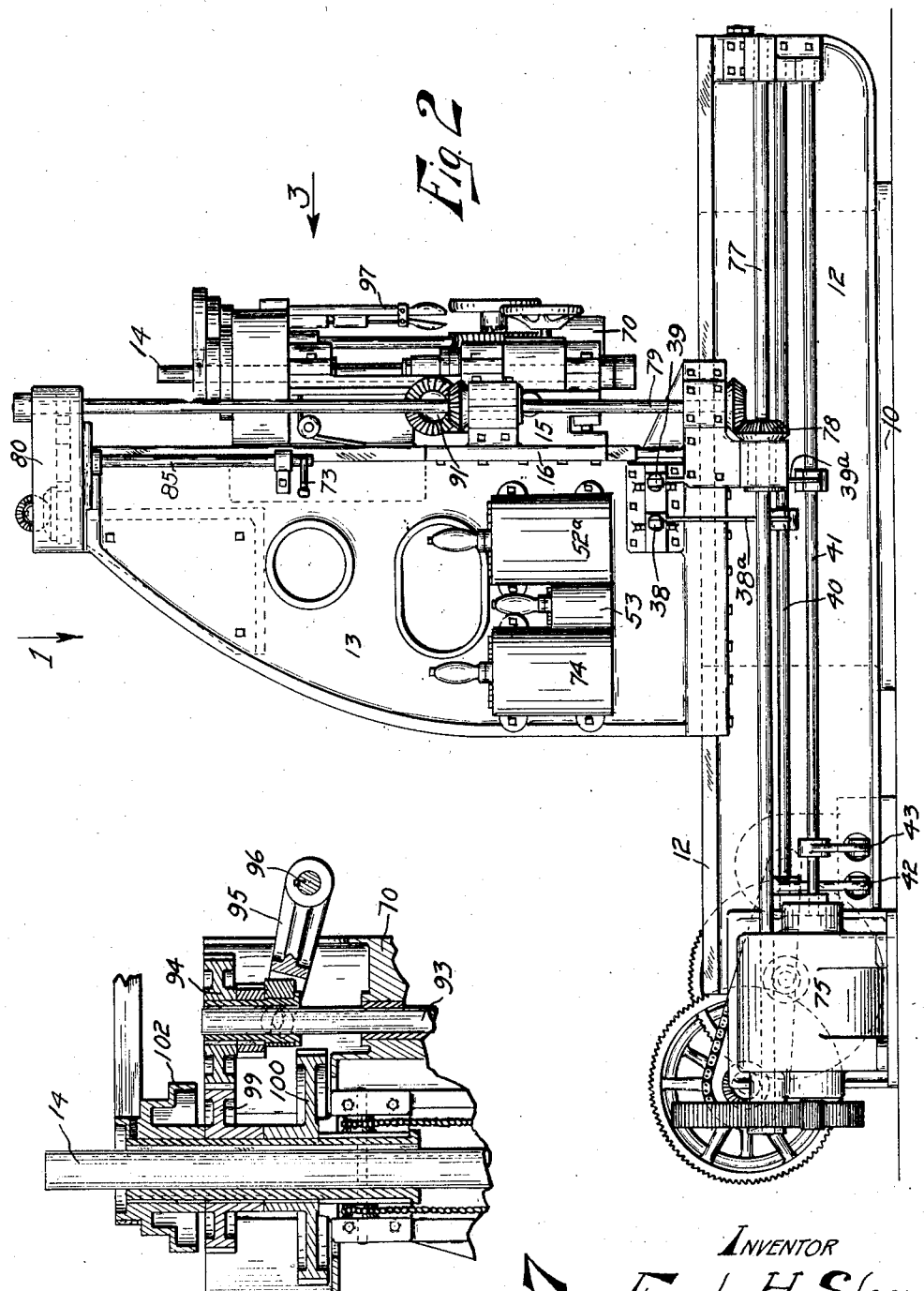
INVENTOR
Frank H. Sleeper
By Attorneys

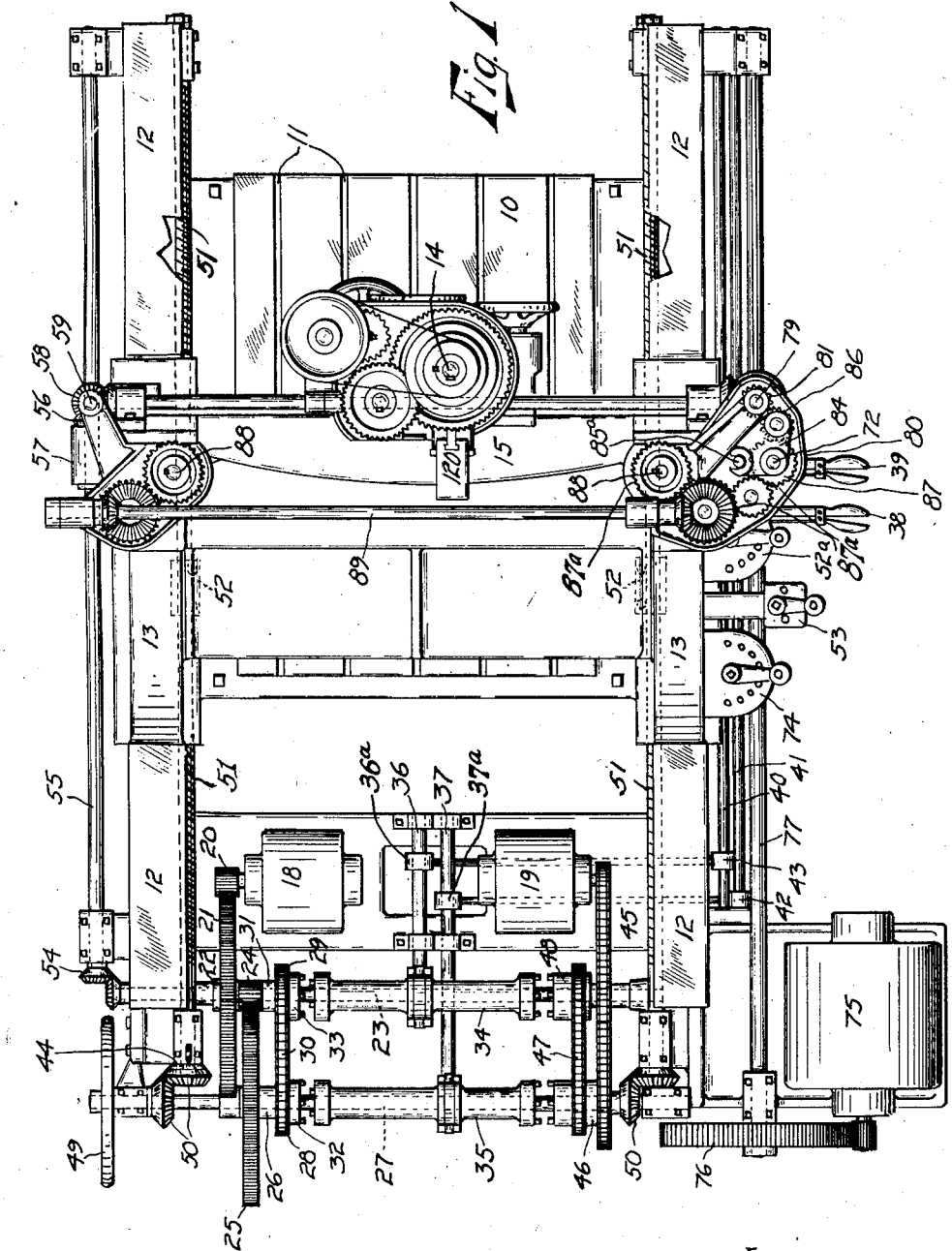

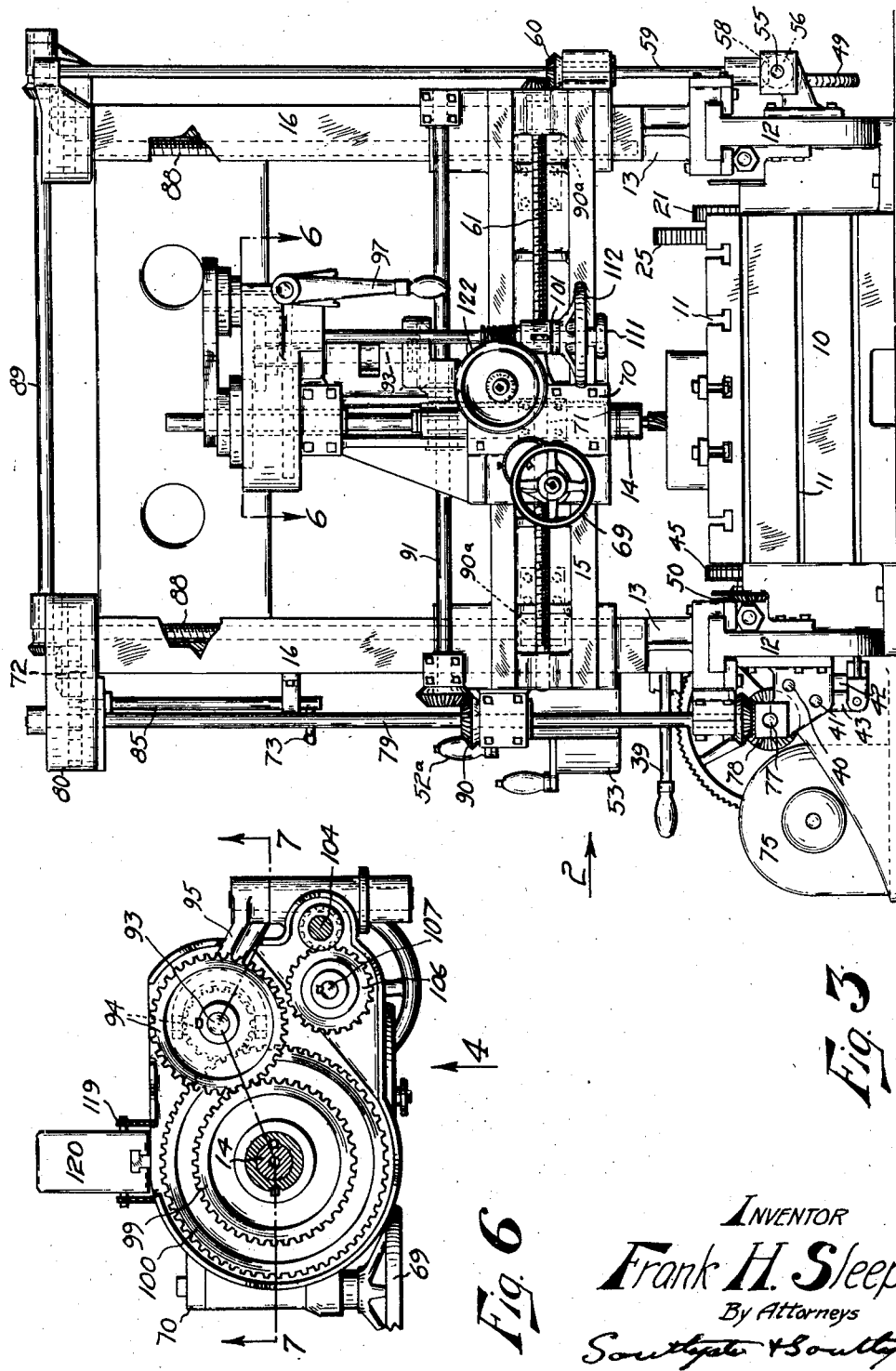

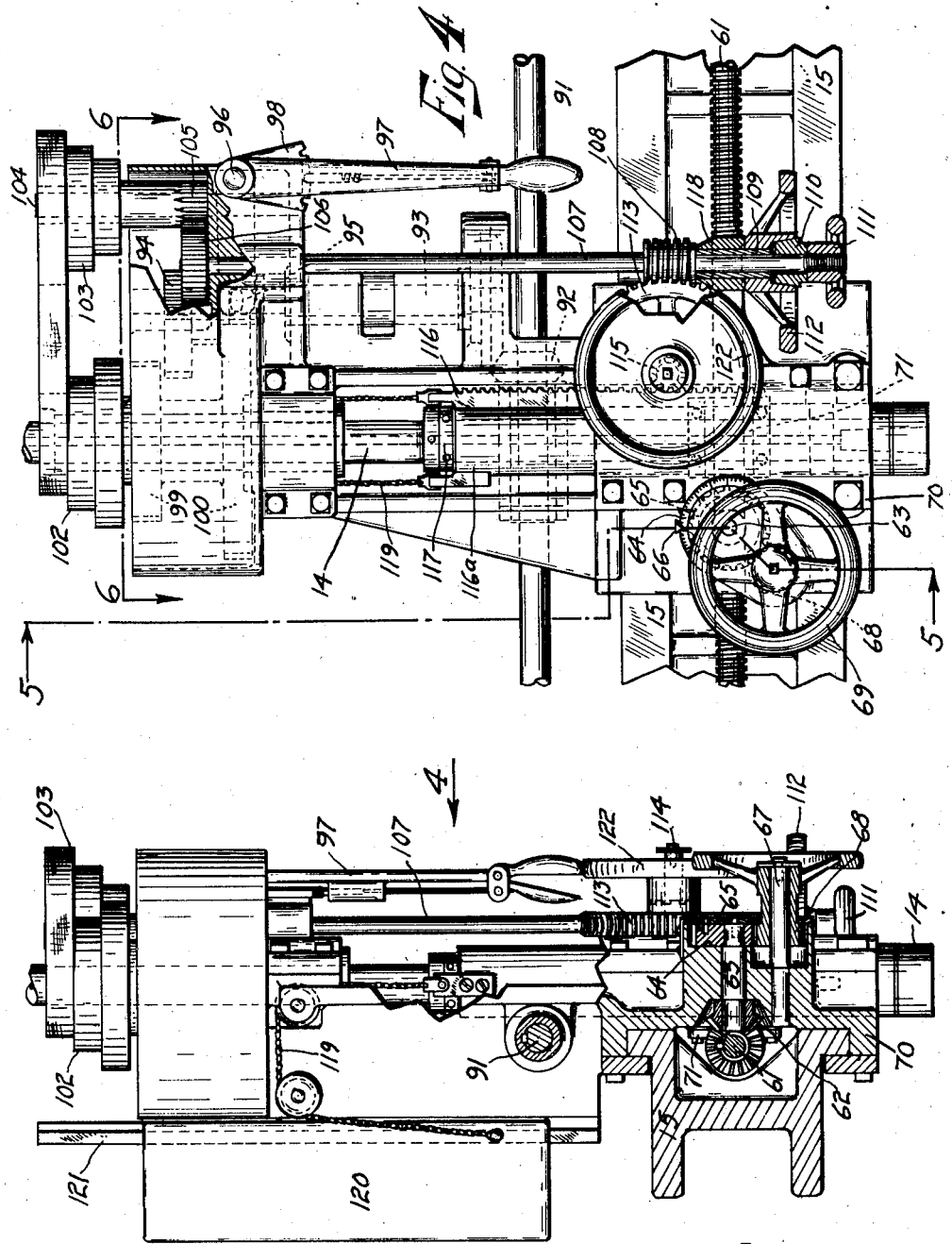

Patented Oct. 12, 1926.

1,602,860

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

MACHINE TOOL.

Application filed December 8, 1923. Serial No. 679,490.

This invention relates to a machine tool having a rotary spindle capable of milling, boring, drilling, tapping, reaming and the like.

The principal objects of the invention are to provide a machine of this character which will be universal in the sense that it will be capable of milling five surfaces of a piece of work placed on the bed without removing or changing the position of the work and also will be capable of performing such operations as drilling, tapping, etc. in one surface of that work; to provide a fixed rigid support for the work with longitudinal guides for side housings for supporting the tool so that it is movable along over the bed, and to provide efficient means for feeding the tool longitudinally, laterally, and vertically in either direction and at different speeds for cut and reverse.

The invention also involves means for operating the different parts of the machine by separate motors so that each motor can be designed or selected for the highest efficiency for its particular kind of work and will not be called upon to perform work which cannot be performed efficiently; for operating the feed by two motors, one designed to develop the desired power for use when cutting and the other designed to develop the desired speed for the quick return and for bringing the tool to the right place to begin the cut; and for connecting either of the motors, but not both at the same time, to the cross or longitudinal feed at will so that each motor can be used for its own work and will not have to be called upon to do the work of a motor better designed for it, except in case of emergency; and an independent motor for operating and feeding the tool so that this motor also can be designed or selected for the exact work it has to do; and improvements in the tool spindle turning, feeding and adjusting mechanism which will adapt it for finishing the several surfaces of the work without moving the work after it is clamped on the stationary bed.

The invention also involves improvements in various details of construction and combinations of parts, as will appear.

Reference is to be had to the accompanying drawings in which—

Fig. 1 is a plan of a machine tool constructed in accordance with this invention;
Fig. 2 is a side view of the same;
Fig. 3 is a front elevation thereof;
Fig. 4 is a front elevation on an enlarged scale of the spindle supporting, feeding, and operating mechanism;
Fig. 5 is a side view of the same partly in section on the line 5—5 of Fig. 4;
Fig. 6 is a horizontal section on the line 6—6 of Figs. 3 and 4; and
Fig. 7 is a vertical sectional view on the broken line 7—7 of Fig. 6.

This machine is intended as a universal machine substantially capable of performing work on five surfaces of a body located in one position. In order to provide a most rigid support for the work and eliminate the necessity of moving back and forth a heavy bed loaded with the work as in a planer, I provide a fixed bed 10 for supporting the work. This bed can be of massive build and is provided with the usual T-slots 11 for use in securing the work to its upper and front surfaces. It extends out at both sides to provide supports for several shafts and other parts of the machine but especially to provide a pair of longitudinal ways 12 extending for a distance back of the bed and also constituting a part of the rigid structure. On these ways are arranged the bottoms of the vertical housings 13 connected with the ways in a well-known way so that the housings can move longitudinally on the ways for the purpose of bringing the cross rail 15 forward and back over the work either for adjustment or feed. These housings are arranged vertically and the upper parts are rigidly connected together by a connecting piece or strut at the top. For the purpose of supporting the cross rail 15 carrying the tool head 70 and spindle 14, the housings are provided with vertical ways or guides 16 on which the cross rail head is adapted to move up and down.

For the purpose of driving certain parts of the machine I provide two motors 18 and 19. One of these motors, preferably the motor 18, is designed for low speed and high power. The other motor 19 is designed for higher speed and less power for use in traversing the tool or cutter back after the cutting stroke and for adjusting the tool to the proper position on the work. The motor 18 is connected by a pinion 20 with a gear 21 on a sleeve 22 loosely rotatable on a cross shaft 23. On this sleeve is a pinion 24 meshing with a gear 25 fixed on a sleeve 26 loosely mounted on a second cross shaft 27 parallel with the shaft 23. On this sleeve 26 is a sprocket wheel 28 operating a sprocket wheel 29 through a chain 30. The sprocket wheel 29 is located on a sleeve 31 loose also on the shaft 23. Both of these two sleeves 26 and 31 have clutch members 32 and 33.

Slidably mounted on the two shafts 23 and 27 are sliding double clutch members 34 and 35 having clutch surfaces on the opposite ends, those on one end co-operating with the clutch members 32 and 33. These two clutch members 34 and 35 are slidably splined to their respective shafts. They are operated along the shafts by a pair of rock shafts 36 and 37'' which are arranged longitudinally of the machine and operated by two hand levers 38 and 39 respectively through a pair of longitudinal shafts 40 and 41 on the operating side of the machine. These shafts are splined the whole length for connecting with these levers by means of arms 38$^a$ and 39$^a$ for turning the shafts from the hand levers and provided with splined arms 42 and 43 which are connected with arms 36$^a$ and 37$^a$ on the two shafts 36 and 37 in any well known way, the details not being shown. These two shafts therefore can be turned to shift all the clutches above described in and out.

It may be mentioned at this point that the motor 19 is connected by a sprocket chain 45 with a sprocket wheel on a sleeve 46 freely rotatable on the shaft 27 which sleeve also has another sprocket wheel which by a chain 47 operates another sleeve 48 freely rotatable on the shaft 23. Clutch members are located on each of these sleeves 46 and 48 for cooperating with the opposite ends of the clutch members 34 and 35.

The parts are shown in Fig. 1 in neutral position with neither of the motors 18 or 19 performing any work. If the clutch member 34 is shifted to the right by its hand lever at the side of the machine, it will connect the motor 18 to the shaft 23 and if shifted to the left it will connect the motor 19 to the shaft 23. In a similar way the clutch member 35 will connect the motor 18 or motor 19 to the shaft 27. Obviously both motors cannot be connected with the same shaft at one but either motor can be connected with both shafts at once or one motor with either shaft and the other motor with the other shaft.

The shaft 27 is connected by bevel gears 50 at each end with two longitudinal feed screws 51, one on each side of the machine and each operating in a nut 52 on the opposite sides of the housing. The operation of this shaft 27 therefore necessarily either feeds or adjusts the housing structure 13 along the horizontal ways 12. The shaft 27 is provided with a hand wheel 49 for operating it by hand for adjusting purposes. It also has a circular scale 44 to indicate the adjustment. I should state at this point that a reversing controller 52$^a$ is connected electrically with the motor 18 by which the motor can be controlled to be driven at varying speeds in either direction and that a simpler reversing controller 53 is similarly connected with the motor 19 to drive it in either direction but not to change its speed.

The shaft 23 is connected at one end only by bevel gears 54 with a longitudinal cross feed drive shaft 55. This shaft has a key slot extending the entire length of it and a bevel gear 56 slidingly keyed to it and mounted in a bearing hub 57 on the side of the housing 13 so that this bevel gear moves along with the housing and is always keyed to the shaft 55. This gear 56 meshes with a bevel gear 58 similarly slidingly keyed to a vertical shaft 59. On this shaft is another bevel gear 60 similarly arranged but supported by the cross rail 15 and driving, by another bevel gear, the horizontal cross feed screw 61 which is supported in suitable bearings on the cross rail and connected with the tool head 70 which is movable along the cross rail.

It will be seen therefore that either one of the motors 18 or 19 can be used to move the housing 13 forward or back over the bed to provide the longitudinal feed or adjustment or they can be used for moving the tool spindle 14 along the cross rail to provide the cross feed as will appear more fully later. In either case the feed can be arranged from the controller to be forward or back as desired and the rate of movement can be changed by shifting from one motor to the other in accordance with the necessities of the case while in the case of the motor 18 the speed of the motor itself can be varied from the controller.

The cross feed is operated from the cross screw 61 by a nut 71 on the back of the tool head. The cross feed screw 61 can also be adjusted by hand as shown especially in Fig. 5. This screw 61 is connected by a pair of bevel gears 62 with a shaft 63 extending longitudinally and having upon it a gear 64 provided with a calibrated disc 65 co-operating with a zero point 66 on the tool head 70 to show the amount of adjustment. This gear 64 meshes with a pinion 68 on another shaft 67 and adapted to be disconnected from it by moving a hand wheel 69 on that shaft out and in. This hand wheel therefore can be used when it is moved out as shown in Fig. 5 to turn the screw 61, but it can be shoved in so that the pinion 68 does not mesh with the gear 64.

From what has been said, it will be seen that the tool head 70 for supporting the tool spindle 14 can be adjusted or fed crossways by the shaft 23 and that the whole housing arrangement which supports the same can be fed longitudinally forward or back or at different speeds by the shaft 27. Either can be operated by either motor 18 or 19. Therefore these two motors operate to locate the tool spindle in the desired position over the work, to feed it on the work in a horizontal plane and to move it back for the next stroke or out. They have nothing to do with the turning of the spindle or feeding it up and down. Their work is all horizontal.

I have shown a third controller 74 adapted to reverse and vary the speeds in both directions and connected by cables, not illustrated, to control the operation of a third motor 75. This motor 75 is connected by gearing 76 to operate a longitudinal shaft 77 at a reduced speed. This shaft is splined throughout its length and has mounted on it a bevel gear 78 slidingly keyed to it and mounted in a suitable bracket on the reciprocating housing 13. This gear, through a similar gear, drives a vertical shaft 79 carried by the housing. This shaft 79 extends up into a casing 80 carried on top of the housing and is provided with a pinion 81 in that casing.

Extending down from the casing is a controlling rod 85 having a handle 73 on the bottom for turning it and a radial arm 85ª on the top. A plate 84 is rotatably mounted on a stud 72 within the casing. On this plate is a stud carrying a pinion 86 which moves around the stud 72 into and out of mesh with the pinion 81 as the rod 85 is turned. The pinion 86 is always in mesh with a gear 87 loose on the stud 72 and driving by a suitable gearing 87ª one of a pair of vertical feed screws 88. These two screws are connected together by a cross shaft 89 and suitable bevel gears. These two vertical feed screws engage in nuts 90ª on the back of the cross head and serve to raise and lower its opposite ends simultaneously and control its elevation.

The vertical shaft 79 is splined throughout its length and a bevel gear 90 is adapted to slide along it and of course is constantly keyed to rotate with it. It has a collar projecting from it mounted in a bracket on the cross head and meshes with a gear on a cross shaft 91. This shaft 91 therefore is constantly driven by the motor 75 whenever that is operating. It is provided on the back of the cross head with a bevel gear 92 slidingly keyed thereon and meshing with a similar gear on a vertical shaft 93. Slidingly keyed on this shaft 93 are a pair of gears 94 adapted to be moved up and down by an arm 95 pivoted on a stud or shaft 96. This shaft has a controlling lever 97 extending down therefrom and operating in a toothed segment 98 in a well known way. These sliding gears 94 can be moved in either direction from the neutral position shown in Fig. 4 so that the larger one can mesh with a smaller gear 99 fixed on the tool spindle 14 or the smaller one can mesh with a larger gear 100 thereon. The adjustment of the hand lever 97 therefore controls the tool spindle to drive it at two different speeds.

On the upper end of the tool spindle 14 is a cone pulley 102 which by a belt drives a pulley 103 on a shaft 104 which carries a pinion 105. This pinion meshes with a gear 106 on a feed drive shaft 107 which is arranged vertically. This shaft is provided with a worm 108 located on a sleeve 109 adapted to be fixed to the shaft by a cone 110 and hand nut 111 engaging a thread on the lower end of the shaft 107. This cone pushes into a conical bushing which constitutes the hub of a hand wheel 112 and secures the bushing and worm in position on the shaft. The bushing is mounted to turn in a hub 118 fixed to the tool head 70. The hand wheel can be turned to operate these parts for fine adjustment. The amount of the adjustment is shown on a circular scale 101.

The worm 108 meshes with a worm wheel 113 on a shaft 114 which carries a pinion 115 meshing with a vertical rack 116. This rack is connected with or formed on a sleeve 116ª containing the spindle 14. The spindle is held in the sleeve by nuts and lock nuts 117 so as to move up and down with it but allow it to rotate within the sleeve. This sleeve and rack are connected by chains 119 with a counterweight 120 in the usual way running on a vertical guide 121 on the back of the tool head. The hub of the gear 113 is provided with clutch teeth and there is a hand wheel 122 slidable on the shaft 114 and having co-operating clutch teeth. By this the tool spindle can be raised and lowered by hand for rough adjustment when the nut 111 is loosened so that the worm 108 is not fixed to the feed drive shaft 107.

It will be seen therefore that the motor 75, while not capable of moving the tool spindle 14 horizontally in any direction, is capable of rotating it in either direction and of moving it up and down by power, either rapidly for adjustment or quick return or slowly for feed, according to the position of the lever 97 and the controller lever 74. Similar operations for adjustment in a different direction can be performed by the hand wheels 69 and 122 and in the former case the amount of adjustment is shown clearly by the graduated circular scale 65. Fine adjustment is made by the hand wheel 112 and read on the scale 101. These operations are entirely independent of the movement of the cross head longitudinally of the machine and the tool head along the cross head which is performed by the other two motors 18 and 19.

From this it will appear that while the operator is moving the tool spindle around to the proper position over the work he manipulates it by means of the motor 19 preferably without using the other motors, although the motor 75 can be in operation at the same time to rotate the spindle 14. Then when he gets the tool to the right position to feed into the work, he shifts it over to have the motor 18 control that operation if the cut is to be horizontally across the work. If, however, he is boring, or drilling or cutting down one of the vertical faces, he controls that operation by the controller 74 and motor 75. It is to be understood however, that he can cut across the front or rear of the work or on either of the opposite sides by the use of the motor 18, having a milling cutter on the tool spindle, and preferably keeping the spindle at constant elevation during the cut.

It is also possible to cut, so to speak, in two directions at once. That is, he can feed the spindle across by means of the shaft 23 and at the same time feed the housing along the work by means of the shaft 27. These two shafts can both be run by the motor 18 at that time. In that case he gets a diagonal cut and he can feed forward and back diagonally just as easily as he can forward and back longitudinally or cross ways. The same kind of a cut can be made on the side of the work by having his longitudinal feed through the shaft 27 operating while the vertical feed by the motor 75 is connected up. This would give a slanting cut and he can cut back and forth with that cut feeding laterally between each two operations if the shape and character of the work are such as to make that desirable. Of course a corresponding operation can be performed on the end of the work or in fact it is possible to have all three feeds in operation at once for cutting a flat surface inclined both to the horizontal and vertical.

The method of using the machine for boring, drilling, tapping, reaming and the like will be obvious and need not be described in detail. It is to be understood of course that in case of emergency the two motors 18 and 19 can be substituted for each other to some extent. If one motor were burned out the machine could still be used, although not with the full efficiency, operated by the other of these two motors.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described, but what I do claim is:—

1. A machine tool, comprising a fixed work bed and horizontal ways, vertical housings slidable on said ways, a cross rail slidable up and down on said housings, a tool carriage slidable back and forth on said cross rail, a tool spindle in said carriage, two motors of different capacities, operative connections between said motors, said housings and said tool carriage, whereby said tool spindle is moved horizontally in any direction, relatively to the work, by one or the other of said motors, a third motor, and operative connections therefrom to said cross rail and to said spindle, whereby said spindle is moved vertically relatively to the work and is rotated.

2. A machine tool, comprising a fixed work bed and horizontal ways extending along the sides and beyond the ends thereof, vertical housings connected at their tops and slidable on said ways, a cross rail carried by said housings and movable vertically thereon, a tool carriage slidable horizontally on said rail, a rotatable tool spindle movable vertically in said carriage, a pair of motors either one of which can be connected to said housings and tool carriage to impart horizontal movements to said tool spindle but both of which cannot be connected at the same time, a third motor connected to said rail to move it vertically and to said spindle to rotate it, means to vary the speed of said motors and means for manually moving said housings and said rail.

3. In a milling machine, the combination with a stationary bed for supporting the work having a pair of horizontal ways, of a housing mounted to move on said ways, a cross head vertically movable on the housing, a motor, a shaft connected with the motor, a vertical shaft constantly connected with the first shaft, a train of gears located on the cross head, one fixed on the vertical shaft and one of them being movable into and out of mesh therewith, a pair of vertical screws supported by the housing and connected with the cross head for moving it, and means for connecting said train of gears with both vertical screws.

4. In a milling machine, the combination with a stationary bed for supporting the work having a pair of horizontal ways, of a housing, means for moving the housing along the ways, a cross head vertically movable on the housing, a motor, a shaft connected with the motor, means adapted to be moved into and out of connection with the shaft for raising and lowering the cross head, a cross shaft supported by the cross head and constantly driven by said shaft, a tool spindle on the cross head and means operated by the cross shaft for rotating said spindle.

5. In a milling machine, the combination with a stationary bed for supporting the work, of a housing mounted thereover, a cross head vertically movable on the housing, a motor, a horizontal shaft connected with the motor, a vertical shaft constantly connected with the horizontal shaft, means adapted to be brought into and out of connection with the vertical shaft for raising and lowering the cross head, a cross shaft carried by the cross head and constantly connected with the vertical shaft, a tool head movable along the cross head, and a speed change device on the tool head constantly in driving connection with the cross shaft for operating the tool spindle.

6. In a milling machine, the combination with a bed for supporting the work having ways, of a housing mounted on said ways, a cross head vertically movable on the housing, a motor, a shaft connected with the motor, means for connecting the cross head with the vertical shaft for raising and lowering the cross head, a cross shaft carried by the cross head and constantly connected with the vertical shaft, a tool head movable along the cross head, a speed change device on the tool head constantly in driving connection with the cross shaft for operating the tool spindle, means on the tool head for feeding the spindle up and down thereon, and means connected with said cross shaft for operating the last named means.

7. In a machine tool, the combination with a bed for supporting the work, of a housing mounted over the bed, a cross head vertically movable on the housing, means for connecting the cross head with a source of power for raising and lowering the cross head, a cross shaft carried by the cross head, a tool head movable along the cross head, a speed change device on the tool head in driving connection with the cross shaft for operating the tool spindle, a slow feed device connected with the cross shaft for feeding the spindle down, means for disconnecting the slow speed device from the cross shaft, and a hand wheel for operating the slow speed device when so disconnected.

8. In a machine tool, the combination with means for causing a relative motion between the work and the tool for operating upon it comprising two motors, and means whereby either motor can be connected with said operating means, of a third motor, and means connected with the third motor for rotating the tool.

9. In a milling machine, the combination with means for causing a relative motion between the work and the tool for operating upon it comprising two motors, and means whereby either motor can be connected with said operating means, one of said motors being designed for high power and low speed and the other for high speed and low power, whereby the latter can be used for preliminarily adjusting the work and tool with respect to each other or for a quick return and the other can be used for cutting, of a third motor, means for operating the third motor in either direction and at varying speeds, and means connected with the third motor for rotating the tool and feeding it toward the work.

10. In a milling machine, the combination with a bed for supporting the work having ways, of a housing mounted to move on said ways, means for moving the housing along the ways, a cross head movable along the housing, a motor, a shaft parallel with the ways connected with the motor, a second shaft connected with the first shaft, and means adapted to be brought into and out of connection with the second shaft for moving the cross head on the housing.

11. In a machine tool, the combination with a fixed bed, a head for supporting a cutting tool, and means for moving the tool over the work, of a shaft constantly connected with said moving means for operating it, a pair of clutch members facing each other at a distance apart on said shaft and freely rotatable thereon, two motors of different speed and power, each connected with one of said clutch members for driving it, a clutch member between the two clutch members slidingly keyed to the shaft to be connected with either clutch member for transmitting power from either motor, and means for rotating the cutting tool.

12. In a milling machine, the combination of a bed for supporting the work, said bed having longitudinal ways, housings mounted to move along said ways and supported thereby, a tool head carried by said housings and movable transversely on them and adapted for carrying a tool for operating on the work, means for feeding the tool head across the housings, means for feeding the housings along the bed, a pair of transverse shafts, one connected with one of said means for operating it and the other connected with the other means for operating that, two motors of different power and speed, means for connecting either motor with either shaft at will for feeding the tool either longitudinally or crossways by either motor, and means for rotating the tool.

13. In a machine tool, the combination of a bed for supporting the work, said bed having longitudinal ways, housings mounted to move along said ways and supported thereby, a tool head carried by said housings and movable transversely on them and adapted for carrying a tool for operating on the work, a screw for feeding the tool head across the housing, a pair of screws for feeding the housing along the bed, a pair of transverse shafts, one connected with said pair of screws for operating them and the other connected with the first named screw for operating that, two motors, two loosely mounted clutch members on each shaft, means connected with one motor for driving one of said clutch members on each shaft continuously when the motor is in operation, means for connecting the other motor for driving the other two clutch members continuously when that motor is in operation, clutch members slidingly keyed to the respective shafts and capable of moving into a position to clutch either of the clutch members thereon to the shaft and transmitting power from that motor to it, and means for rotating and feeding the tool.

In testimony whereof I have hereunto affixed my signature.

FRANK H. SLEEPER.